2 Sheets—Sheet 1.
R. W. BURTON.
Altitude Attachment for Distance Instruments.
No. 219,146. Patented Sept. 2, 1879.
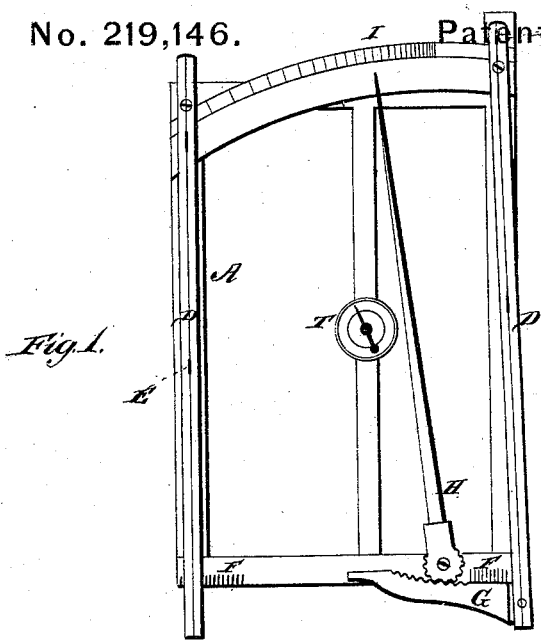
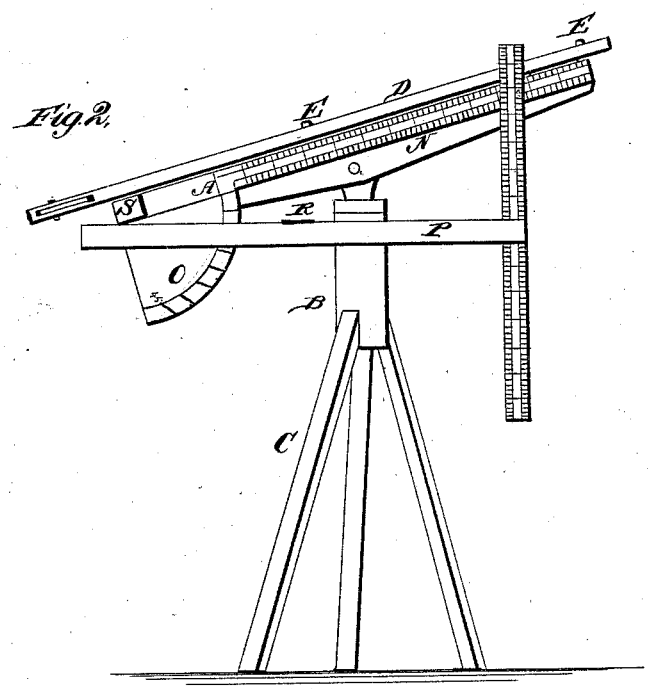
WITNESSES
INVENTOR
Robert W. Burton
By Gilmore, Smith & Co.
ATTORNEYS

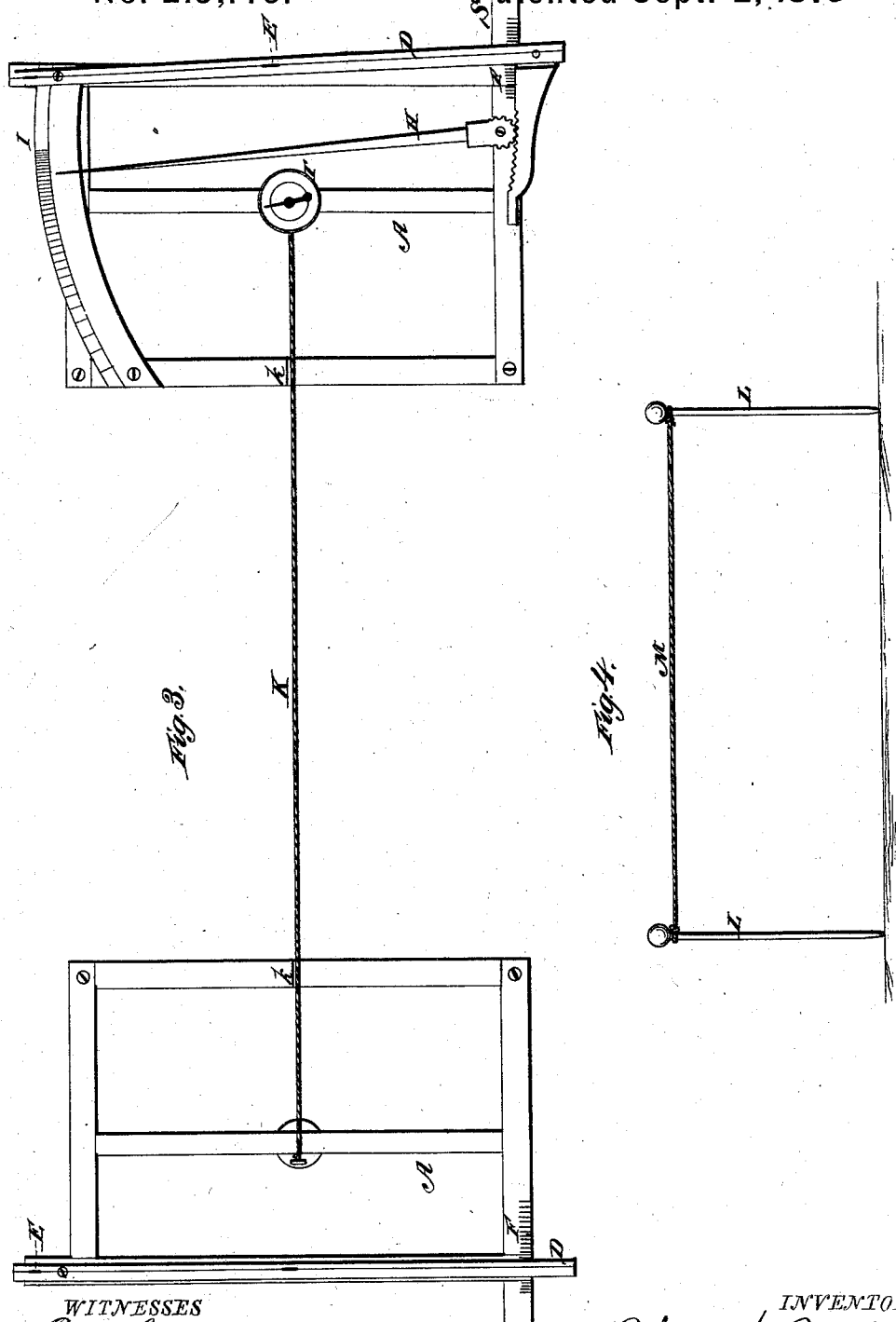

UNITED STATES PATENT OFFICE.

ROBERT W. BURTON, OF PRICE'S FORKS, VIRGINIA.

IMPROVEMENT IN ALTITUDE ATTACHMENTS FOR DISTANCE-INSTRUMENTS.

Specification forming part of Letters Patent No. 219,146, dated September 2, 1879; application filed February 15, 1879.

*To all whom it may concern:*

Be it known that I, ROBERT W. BURTON, of Price's Forks, in the county of Montgomery and State of Virginia, have invented a new and valuable Improvement in Measuring Distances; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a single plan view. Fig. 2 is a side elevation. Fig. 3 is a double plan view, and Fig. 4 a detail.

This invention relates to instruments for measuring distances; and it consists in the improvements in the construction of the same, hereinafter fully described, and particularly pointed out in the claim.

In the drawings, A indicates a platform or table pivoted to a standard, B, mounted upon suitable supports C. D represents two pointers pivoted at their forward ends to the forward end, at opposite sides, of the platform. Said pointers are provided with sights E E, by means of which they may be aligned with the object the distance to which is to be measured.

At the rear of the table or platform, at each side, is a scale, F, by means of which the angle at which the pointer is set when aligned with an object may be indicated. To the rear of one of the pointers is pivoted a lever, G, which is provided with a series of ratchet-teeth adapted to be thrown into and out of gear with an index, H, pivoted to the platform, the forward end of which is adapted to traverse, in the arc of a circle, a segmental scale, I, marked to indicate a series of distances.

In using the instrument, the table is first placed at the proper angle, and the pointer on the left is aligned by means of the sights with the object, some prominent point of the object as a focus. The pointer on the right is then moved so as to occupy a position on its scale F similar to the position of the pointer at the left with respect to its scale. The ratcheted lever is then thrown into gear with the ratchet on the index, and the pointer is then aligned with the object, which will move the index so as to indicate upon the scale I.

In the modification shown in Fig. 3 two platforms or tables are employed, each being provided with a single pointer. Said platforms are connected by means of a cord, K, and are marked at the sides, as shown at k, by means of which they can be arranged in proper relative positions by aligning the cord with the marks. The pointer on the table at the left is aligned with the object in the same manner as the pointer at the left of the table or platform before mentioned, and the pointer on the right-hand table is operated in a similar manner to the pointer at the right of the before-mentioned platform, to indicate the distance, both tables being provided with scales F at the rear of the respective pointers, the right-hand table being provided with an index and scale, the index being connected with the pointer, as before mentioned.

When the place to be measured to is accessible but one pointer may be used in determining the distance—viz., the pointer connected with the index. In this case two object-sticks, L L, connected by a cord, M, are employed in connection with the instrument. The cord in this case must be of a length corresponding to the distance between the tables, when two are employed. When but one pointer is employed the object-sticks are planted in front of the instrument at the point to be measured to, with the connecting-cord as nearly as possible at right angles to the instrument. The pointer is then directed to the stick at the right, and after the frame is secured is moved so as to bear on the stick at the left, which gives the distance on the scale exactly as if the combined instruments were used.

The letter N represents a scale marked on one side of the table or platform carrying the index and scale before mentioned. Said scale N is marked to correspond with the marks on the scale I. At the rear end of said scale N is a graduated quadrant, O, marked to indicate from 0 to 45°. P represents a T-square provided with a spirit-level, R. The cross-piece of said square is graduated from the center to each end to indicate inches and feet.

Said square is designed to be employed, in connection with the scale N and quadrant O on the table, to indicate the height of distant objects, as follows: The distance is first determined on the scale I, as before mentioned. The T-square is then placed under the projection S at the side of the table, and its shank brought to a horizontal position by means of the spirit-level located in said shank. The cross-piece will then be in a perpendicular position, and by shifting the square so that the edge of the cross-piece will fall opposite the degree on the scale N corresponding to the degree marked on the scale I by the index the edge of the table will fall opposite the degree on the cross-piece of the T-square indicating the height of the object. When measuring from above the object the shank of the T-square is placed above the projection S, and the height of the object is arrived at in a similar manner.

The letter T represents a compass, which indicates the direction of the object from the location of the instrument.

When the instrument is to be used for measuring long distances a telescope is to be employed in connection with the pointers.

My invention is applicable to general surveying purposes, but is particularly advantageous in gunnery as an aid in determining the distance and elevation of an enemy's position or works, and when so employed will save much waste of ammunition occasioned by ineffective shots.

I claim—

In combination with the platform and the mechanism for measuring distances mounted thereon, the scale and quadrant on the side of said platform, and the graduated T-square provided with a spirit-level and adapted to be employed in connection with said platform to determine the altitude of distant objects, substantially as specified.

In testimony that I claim the above I have hereunto subscribed my name in the presence of two witnesses.

ROBERT WILSON BURTON.

Witnesses:
M. S. PRICE,
J. B. PRICE.